United States Patent [19]

Moos

[11] Patent Number: 5,720,885
[45] Date of Patent: Feb. 24, 1998

[54] PROCESS AND DEVICE FOR THE TREATMENT AND/OR DEWATERING OF SLUDGE TAKEN FROM WASTE WATER CESSPOOLS, ESPECIALLY SMALL-SCALE SEWAGE TREATMENT PLANTS

[75] Inventor: Simon Moos, Sonderborg, Denmark

[73] Assignee: Simon Moos Maskinfabrik A/S, Sonderborg, Denmark

[21] Appl. No.: 532,840

[22] PCT Filed: Sep. 16, 1993

[86] PCT No.: PCT/EP93/02501

§ 371 Date: Dec. 8, 1995

§ 102(e) Date: Dec. 8, 1995

[87] PCT Pub. No.: WO94/24059

PCT Pub. Date: Oct. 27, 1994

[30] Foreign Application Priority Data

Apr. 10, 1993 [DE] Germany ............... 43 11 837.2

[51] Int. Cl.⁶ .................................................. C02F 1/52
[52] U.S. Cl. ............ 210/710; 210/712; 210/748; 210/747; 210/768; 210/803; 210/804; 210/806; 210/112; 210/117; 210/170; 210/195.1; 210/196; 210/203; 210/241; 210/257.1; 210/258; 210/532.2
[58] Field of Search ......................... 210/710, 712, 210/725, 727, 728, 748, 764, 767, 768, 747, 803, 804, 806, 112, 117, 136, 170, 195.1, 196, 203, 241, 248, 257.1, 258, 532.2

[56] References Cited

U.S. PATENT DOCUMENTS

| | | | |
|---|---|---|---|
| 1,344,710 | 6/1920 | Otterson | 210/241 |
| 3,474,833 | 10/1969 | Stout et al. | 210/748 |
| 3,630,365 | 12/1971 | Woodbridge et al. | 210/241 |
| 3,893,656 | 7/1975 | Opacic et al. | 257/7 |
| 4,069,153 | 1/1978 | Gunther | 210/748 |
| 4,383,920 | 5/1983 | Muller et al. | 210/87 |
| 5,098,580 | 3/1992 | Andersen | 210/241 |
| 5,312,551 | 5/1994 | Perron et al. | 210/241 |
| 5,503,753 | 4/1996 | Woodall et al. | 210/241 |
| 5,536,418 | 7/1996 | Foss | 210/532.2 |

FOREIGN PATENT DOCUMENTS

| | | |
|---|---|---|
| 165 883 | 12/1985 | European Pat. Off. |
| 3219963 A1 | 12/1983 | Germany. |
| 3840276 A1 | 5/1990 | Germany. |
| 2 004 859 | 9/1977 | United Kingdom. |
| WO90/03474 | 4/1990 | WIPO ............... 210/241 |

*Primary Examiner*—Peter A. Hruskoci
*Attorney, Agent, or Firm*—Jones & Askew, LLP

[57] ABSTRACT

Apparatus for treating and dewatering of sludge taken from small-scale sewage treatment plants. The apparatus, which preferably is mounted on a vehicle, incorporates chamber-type units for dewatering, which can be connected by way of feed and return pipes, controllable valves, and pumps that can be switched on and off. A dewatering vessel with filter walls and separate sludge and filtrate chambers is connectable with a sludge chamber and a filtrate chamber, respectively, of a second dewatering vessel by way of joining pipes comprising at least one feeding pump and one controllable valve each, a radiation chamber arranged in the filtrate return pipe of one of the dewatering vessels, and a stone trap arranged in one other sludge feed pipe.

11 Claims, 4 Drawing Sheets

PROCESS AND DEVICE FOR THE TREATMENT AND/OR DEWATERING OF SLUDGE TAKEN FROM WASTE WATER CESSPOOLS, ESPECIALLY SMALL-SCALE SEWAGE TREATMENT PLANTS

The invention relates to a method and a device for the treatment and/or dewatering of sludge taken from waste water cesspools, especially small-scale sewage treatment plants.

DESCRIPTION OF PRIOR ART

According to DK-PS 149 305, a method and a device for the dewatering of sludge by means of gravity have been suggested which involve the pumping of sludge into a sludge vessel incorporating one or several filter elements with which the thickening sludge is separated from the aqueous portion, i.e. from the purified or filtered water. In addition, the applicant has developed a method and a device in which a group of vessels is arranged on a vehicle, comprising a tubular tank for the reception of pumped-up sludge water and a dewatering chamber with filter walls, said filter walls separating the actual dewatering chamber from a residual water chamber lower down. Apart from a flocculation vessel, the device comprises a flocculation pump, a compressor or vacuum pump for pumping the sludge up from a domestic sewage treatment plant or the like, and a hydraulic sludge pump which, after completion of the pumping-up process, conveys the sludge to the dewatering unit, with flocculant being added at the same time to thicken the sludge. This dewatering system is characterized by its compact design, the small number of processing chambers and, assuming that use is made of a rapid-action flocculant (polymer), by the high speed of dewatering at the site of domestic sewage treatment plants (so-called KSE system; printed instructions for use available to the national public).

It is true that another method and a device are known (EP 01 65 883 A1) in which, on a mobile trailer, the sludge to be treated is conveyed through a feeding pipe directly into a coarse filter area and subsequently to a flocculation area provided with a plurality of chambers. Beyond this are three more vessels: a first sedimentation vessel in which a mixture of filtered matter and sludge is treated with compressed-air jets. From there the filtrate, which still contains small particles, flows to the second sedimentation vessel where it undergoes essentially the same treatment with compressed-air jets. The sludge from the first and second sedimentation vessels is conveyed to the third vessel, i.e. the actual sludge vessel. The purified filtrate can be discharged without further treatment, while the sludge from the third vessel is treated in a centrifugal filter press to produce dry substance. In the first two sedimentation vessels, however, virtually no dry substance is produced. They do not have individual chambers separated by filter sieves. Neither of the sedimentation vessels has a special means for cleaning the bottom; and in both vessels the particles are finely dispersed in essentially the same way by means of compressed-air jets, in the second step down to a size of some 150 microns. Even more important, there are no pipes or control components provided to convey purified filtrate to the feeding pipe and to discharge it from there back into the same waste water cesspool.

The method of sterilizing a liquid with the help of UV radiators is familiar for a different type of medium, i.e. for the production of drinking water in deserts and the like (DE-OS 38 40 276 A1). Drinking water plants, however, are stationary. The treatment chamber is placed upstream of the place of consumption, not in the discharge pipe leading back to the original source. A suitable maximum radiation level cannot be inferred.

OBJECT OF THE INVENTION

The object to be established by the present invention relates to a further embodiment and refinement of the KSE system. Here, the following has been taken into account: In the last few years, the requirements concerning the quality of water treated in the plant (filtered water, reject water) have become increasingly stringent in terms of the transfer of bacteria and germs between individual domestic sewage treatment plants as well as in terms of the pH-value. Known devices reflect this situation only partially if at all.

In addition, the devices which are already known for the treatment and/or dewatering of sludge from waste water cesspools do not sufficiently take into account the requirement that the respective pipes and/or vessels be adequately cleaned after completion of a treatment cycle at a cesspool (during which, after all, several cubic meters of sludge water are pumped into the dewatering device, where the sludge remains for the time being, since only the filtered water is discharged back into the cesspool after treatment). For one thing, this procedure increases the amount of bacteria and harmful germs in the plant; for another, the capacity of the vessels is reduced, and the residues which are deposited on the inner pipe walls can harden and reduce the efficiency of the plant. This is especially the case if larger solid bodies are contained in the sludge that is pumped up into the device.

The object of the present invention is to provide a method of thoroughly and quickly cleaning the dewatering plant in a device of the kind described in the beginning for the treatment and/or dewatering of sludge taken from waste water cesspools, this being done after the sludge water has been pumped up and discharged back, as well as a method of destroying germs and bacteria.

SUMMARY OF THE SOLUTION

The advantages inherent in the invention are to be seen principally in the fact that the dewatering chambers for sludge and/or filtered water, which form part of the dewatering unit, are completely cleared of residual sludge and larger solid bodies, and of filtered water. This is important because it means that these chambers and vessels are cleaned, and, in particular, that residual sludge and filtrate removed in this way cannot mix with new pumped-up sludge and sludge water from other domestic sewage treatment plants, thus transferring germs and bacteria.

According to other embodiments of the invention, this effect is enhanced even further by exposing the filtered water that is to be discharged back into the cesspool to radiation which destroys germs and bacteria in the plant itself. This effect is enhanced if use is made of ultraviolet light, especially UV light with a maximum radiation amplitude of 253.7 nanometers.

The device characterized in further claims concerning the implementation of the method involves a pumping and piping system which is specifically adjusted to the method and permits rapid clearing of the chambers or vessels of the dewatering unit with a compact setup involving relatively few components. This applies analogously to the stone trap arrangement incorporated in one of the sludge, feeding pipes. One variation of the invention provides for the incorporation of one part of the stone trap in one of the sludge return pipes. Radiation with ultraviolet light or the like is enhanced through the useful arrangement of the radiation chamber in a specified filtrate return pipe and/or through the affixing of reflectors for the radiator.

BRIEF DESCRIPTION OF THE DRAWINGS

One possible embodiment of the invention showing the best method of implementation is depicted in the drawings and will now be described in more detail.

DETAILED DESCRIPTION OF THE INVENTION

Figure 1:
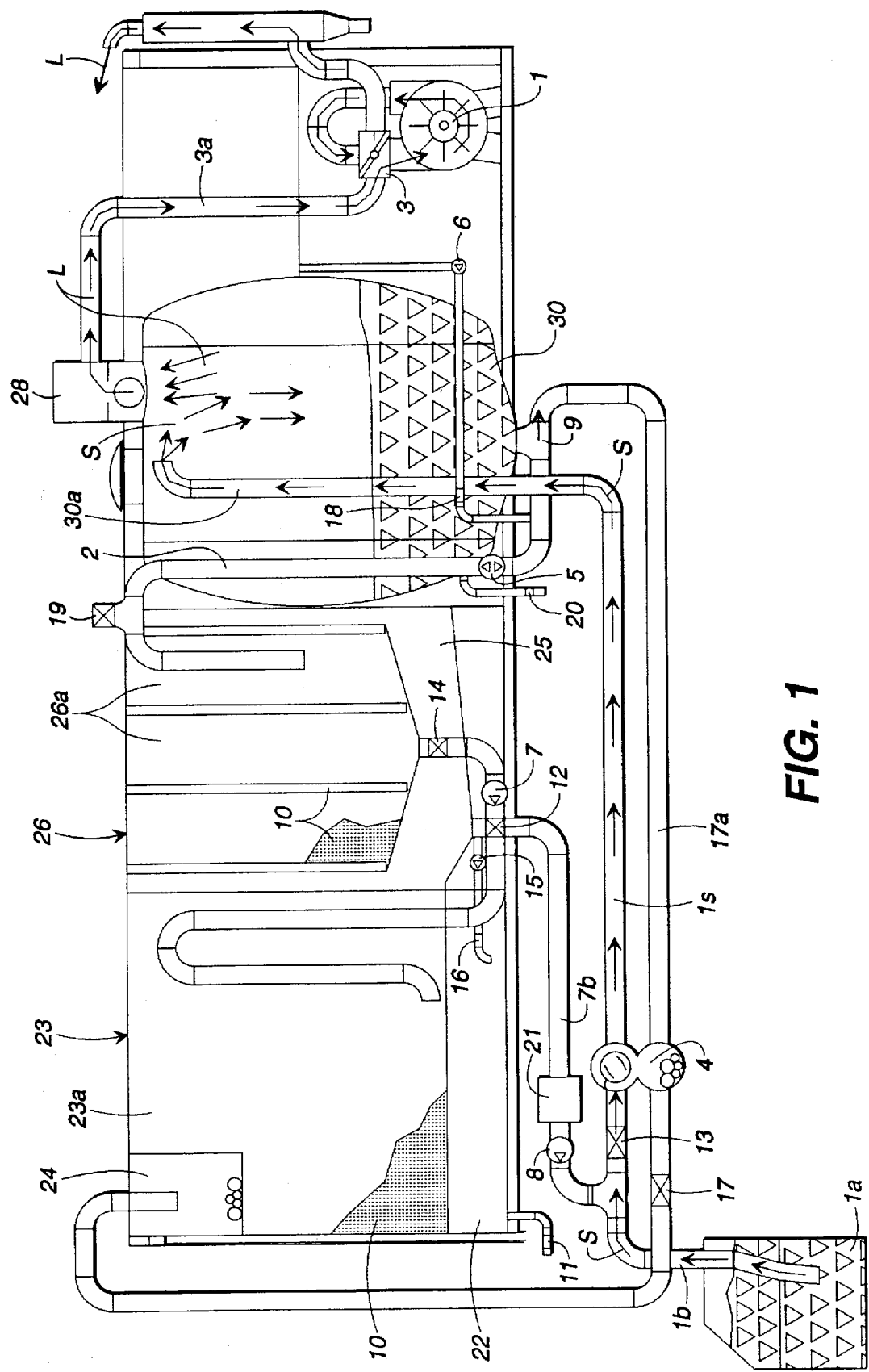
FIG. 1 shows a schematic lateral view of the dewatering device, principally during the process of emptying a cesspool, with S labelling the sludge, L the air, and triangles the formation of sludge.
Figure 4:
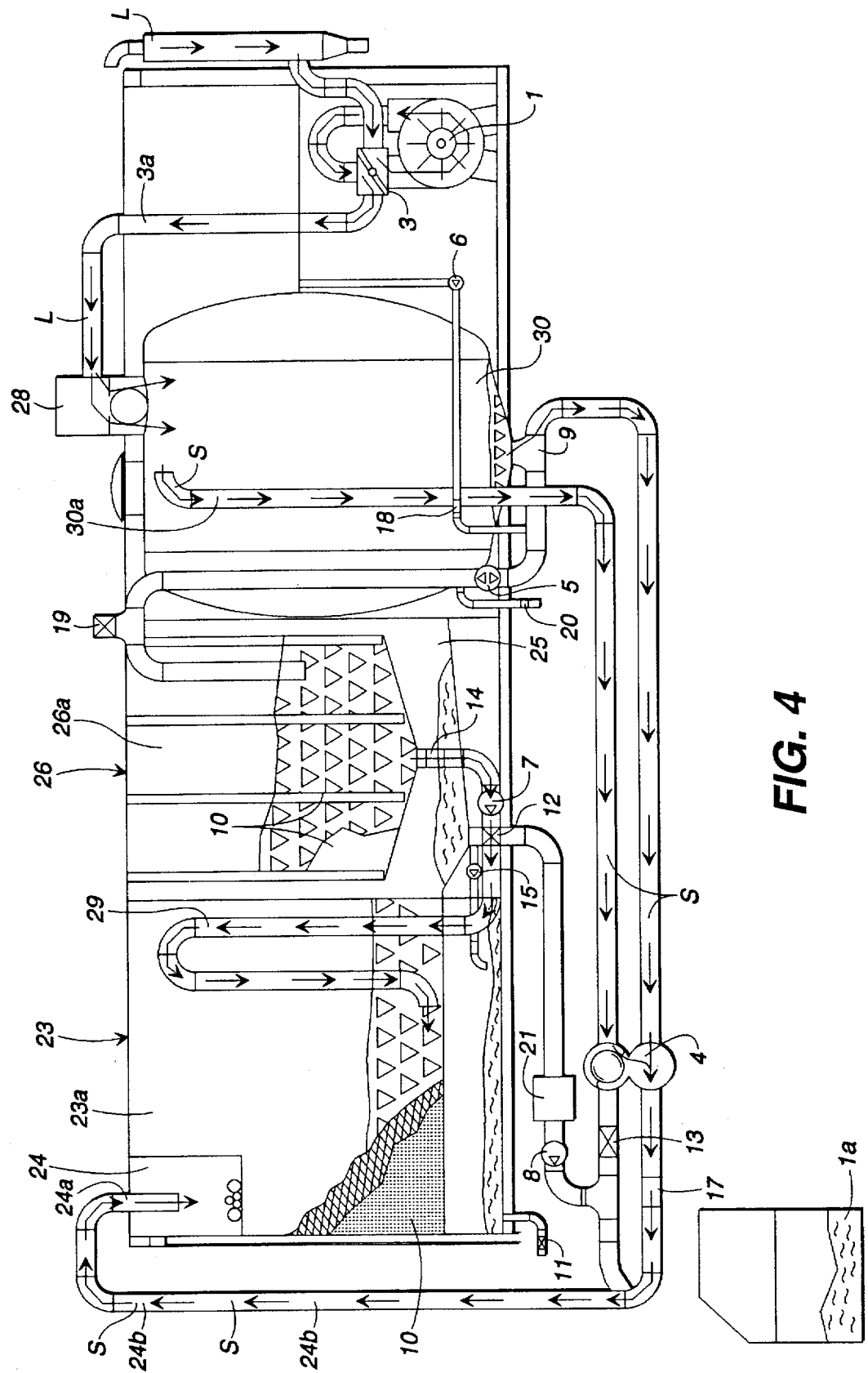
FIG. 4 shows the device in which the cleaning processes taking place upon completion of the first procedural step are depicted, with S labelling not only the sludge, but also stones.

The device comprises a vacuum pump 1, see FIG. 1, which, in a different switching mode, can also be operated as a compressor, see FIG. 4. By way of a flow separator which may take the form of a flap valve 3, the pressure or suction side of the vacuum pump is pneumatically connected up with the upper part of the sludge tank 30 by means of a joining pipe 3a and an air distributor.

When a waste water cesspool, e.g. cesspool 1a, see FIG. 1, must be emptied, the end of the suction hose 1b is inserted into the cesspool with the help of a hose winder not depicted here. Then vacuum pump 1 is started, the first sludge valve (hereinafter S valve) 13 is opened, and the content of the cesspool is both sucked up and conveyed through a stone trap which is designed and/or arranged in such a way that it sorts out stones and larger particles which fall to its lower part, e.g. a trough, as can be seen in FIGS. 1-4. This effectively prevents the destruction of the first sludge pump 5. The mixture of sludge and sludge water is then conveyed to the sludge tank 30 by way of pumping-up pipe 30a, the sludge cleaning valve (hereinafter SC valve) 9 being kept closed; the sludge initially settles at the bottom of the tank. When the cesspool has been emptied in the specified manner, the vacuum pump 1 is turned off and the first S valve 13 is closed, so that none of the sludge can flow back to pipe 30a. The open positions of the valves are labeled with a rectangle; closed positions are labeled with an x inside said rectangle. Before the aforementioned step was performed, the device had already been in use, as is indicated by a small quantity of residual sludge in the first dewatering vessel 26 and a larger quantity of the same residual sludge in the second dewatering vessel 23 (black illustration).

Figure 2:
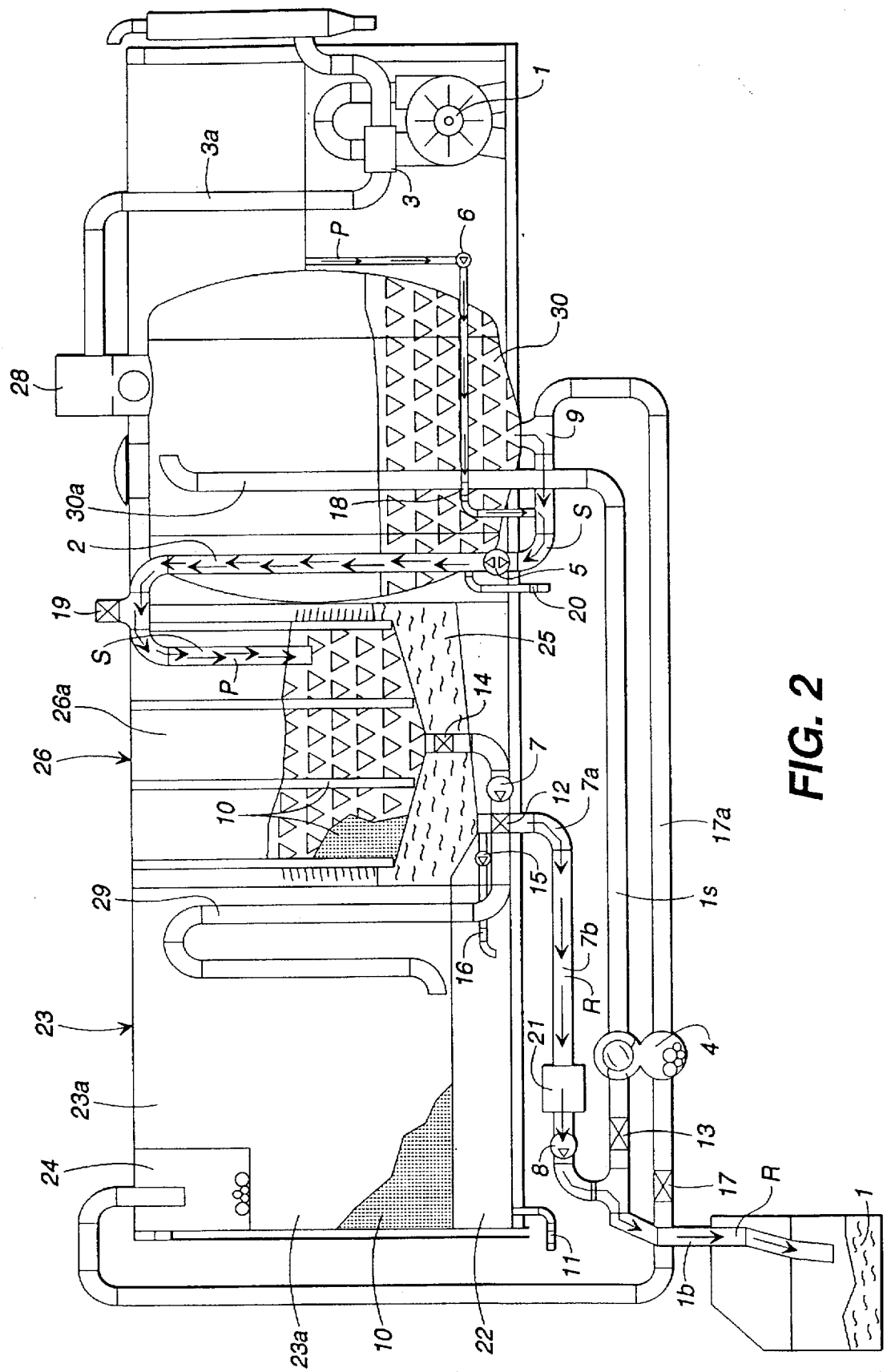
FIG. 2 shows the same device, but principally during the process of pumping up the sludge from the cesspool, the addition of flocculant and the discharge of the purified filtered water back into the cesspool, with R labelling the filtered water, P the polymer, S the sludge and the wavy line or the letter R in the vessels labelling the filtered water.
Figure 3:
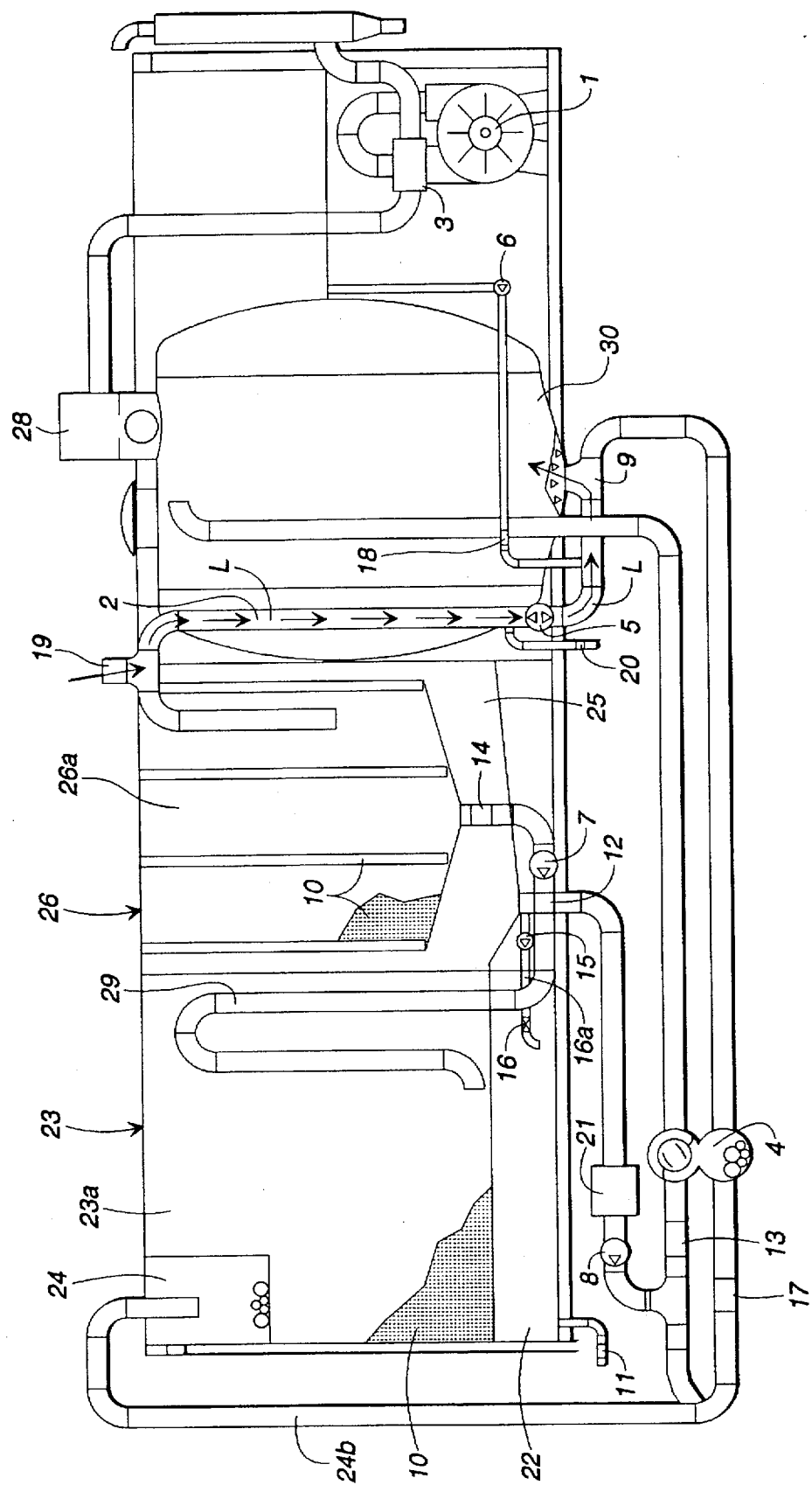
FIG. 3 shows the same device, but illustrates the method of working and component positions while the pumping-up pipe of the first dewatering chamber is being emptied.

The subsequent step, see FIG. 2, illustrates the addition of polymer and the pumping back of the filtered water, which can be carried out simultaneously. Polymer addition is also possible during the pumping-up process itself. The first sludge pump 5 and a polymer pump 6 are started with the SC valve closed, the sludge S and the polymer P are mixed as required, and said mixture is pumped up through pumping-up pipe 2 and the sludge tank 30, with a second sludge valve (hereinafter S valve) 19 necessarily being open. The pumping-up pipe is inserted into the upper part of dewatering vessel 26, into which the sludge is now pumped. At the same time, the polymer pump adds optimum amounts of the flocculation mixture to the sludge S, so that flocculation and dewatering of sludge S begins in sludge chamber 26a. The dewatering vessel 26 is surrounded by a number of filter walls, preferably sieve walls, which retain more solid particles from the sludge in chamber 26a, but permit the flow of the aqueous portion though the meshes into a first filtrate chamber 25. There is a third sludge valve 14 at the bottom of chamber 26a, hereinafter called S valve, while the residual filtered water can also be discharged from the filtrate chamber 25 by way of a pipe section incorporating a filtrate cleaning valve 16, hereinafter called FC valve, provided that the main portion of the filtered water has first been pumped to a first return pipe 7b by means of a filtrate pump 8. FIG. 2 illustrates that the filtered water separated in filtrate chamber 25 can be pumped back while the pumping-up procedure takes place, see pumping-up pipe 2. In this case, another filtrate valve 12, which is connected up with chamber 25 is opened, while the sludge valve 13 is closed more or less at the same time, so that filtered water R is pumped back to the cesspool 1a, since the filtrate pump 8 has been turned on. In this connection, it is important to incorporate a radiation chamber, hereinafter called chamber 21, with one or several radiators which destroy bacteria and germs, especially ultraviolet radiators with a wavelength of 253.7 nanometers. The filtered water flows through one part of this chamber, with the adjacent radiators destroying the germs contained therein.

When the content of the sludge tank 30 has been emptied into the first dewatering vessel 26 and the first filtrate chamber 25 has also been emptied by pumping the filtered water back into the cesspool 1a, the first sludge pump 5, the polymer pump 6 and the filtrate discharge pump 8 are turned off and the SC valve 9, the filtrate valve 12 and the second sludge valve 19 are closed. The processing of the first domestic sewage treatment plant has now been completed, and the suction hose can be wound up. The thickened sludge remains in sludge chamber 26a of dewatering vessel 26, as indicated in black. The vehicle is stationary. In order to clear pumping-up pipe 2, the operator, see FIG. 3, now turns on sludge pump 5 after having opened sludge valve 19 and switching SC valve 9 to the direction of the bottom of sludge tank 30. As is depicted by the arrows in FIG. 3, the inside of the pumping-up pipe is thoroughly cleaned and cleared in such a way that the sludge contained therein is conveyed to sludge tank 30. Upon completion of this step, the sludge pump 5 is turned off and the valves 19 and 9 are closed. It should be pointed out that this cleaning procedure can also be performed independently or analogously with respect to other pipes and pumping-up pipes which may contain residual sludge and can be connected up with a hydraulic or pneumatic sludge feed pump or else incorporate such a pump themselves.

The cleaning procedures with respect to the sludge tank 30 and the first dewatering vessel 26, its filtrate chamber 25 and a second return pipe 1S between pumping-up pipe 30a and the stone trap or the beginning of the suction pipe (at sludge valve 13) will be described by reference to FIG. 4.

In this case, pump 1 is switched to function as a compressor for the release of compressed air into joining pipe 3a, which, in the other case, see FIG. 1, served as a suction pipe. The valve flap of flap valve 3 is switched accordingly. Compressed air enters into collection tank 30, increasing the air pressure here and at the same time in pumping-up pipe 30a, from which stones and residual sludge move in the direction of the arrows through return pipe 1S towards the stone trap 4. In this way, this part of the piping is thoroughly cleared and cleaned. Simultaneously, the SC valve 9 is opened in the direction of the third return pipe 17a, so that residual sludge, stones and the like are also conveyed from the bottom area of the sludge tank 30 to the stone trap 4. Since the first sludge valve 13 was closed before, the stones and the residual sludge S, see left-hand side of FIG. 4, are conveyed to the second dewatering vessel 23 by way of feeding pipe 24b.

Said feeding pipe preferably ends in a chamber 24 incorporating a collection grate or the like. Smaller sludge particles can fall through the perforated slatted floor of the grate; larger solid bodies and stones are retained in chamber 24.

At the same or some other time, the thickened sludge is also conveyed from the first sludge chamber 26a to the second sludge chamber 23a. For this purpose, the second S valve 14 is opened, the second SC sludge pump 7 is turned on, and the sludge is pumped to the sludge chamber 23a of the second dewatering vessel 23 by way of a joining pipe 29. Cleaning and clearing of the first dewatering vessel 26 is now largely completed. New sludge or sludge water that will be conveyed to the first dewatering vessel 26 from a different waste water cesspool in a subsequent procedural step can no longer mix with residual sludge in this area, since no sludge from a preceding treatment cycle has been retained in vessel 26.

Analogously, the same process is carried out for filtered water: The FC pump 15 is turned on, and the FC valve 16 incorporated in the same filtrate pipe is opened. The opening of pump 15 is connected with the bottom part of the first filtrate chamber 25. Residual filtered water is thus conveyed to the second filtrate chamber 22 of the second dewatering vessel 23 by way of the components 25-15-16. The dewatering plant has now been cleared and cleaned, and the vehicle will normally drive to the next domestic sewage treatment plant in order to treat its content in the same way.

At the end of the working day, both the filtered water collected in the second dewatering vessel 23 and the sludge collected therein will be transported to a landfill or be disposed of in a similar way. Only one discharge valve 11 for the filtered water is shown here as an example. The invention is not restricted to the described procedural steps and the described and depicted parts of the device. The invention provides for suitably modified or supplementary procedural steps, depending on the case in question. In addition, the device can be equipped with safety valves, level controls, samplers 20 and the like, depending on the particular application.

From the return pipe 1S the sludge which contains stones is conveyed to the upper part of stone trap 4, which comprises a cylindrical drum that begins to rotate when driven by a motor (not depicted in the drawing) by way of a shaft, as well as perforations and scraping elements between the external wall of the drum and the internal wall of the chamber. The scraping elements run obliquely, i.e. in part radially with respect to the wall, and have a sharp scraping edge, usually a separately fitted knife-type tool made of hard metal. The shaft should be eccentric. As a result, the drum presses the sludge which flows through it into the return pipe, with the scraping element cleaning the internal wall and moving the remaining stones to the lower part.

The radiation chamber can comprise a pipe section, especially one made of quartz, through which filtered water flows. Preferably longish lamps are spaced more or less parallel to each other, around the periphery of pipe section, so that the content of the pipe is exposed to intense radiation, in particular to UV light. Such radiation is concentrated onto a reduced surface area with the help of circularly disposed reflector elements. The lamps are located more or less at the focal point of reflectors, which are, in particular, of parabolic design and made of metal.

I claim:

1. A method for the treatment or dewatering of sludge taken from waste water cesspools by using a dewatering plant arranged on a vehicle, in which sludge from a waste water cesspool is first conveyed to a sludge tank, then flocculated by means of a flocculent, subsequently conveyed to at least one downstream dewatering unit where the sludge is dewatered, with the resulting treated water being discharged back into the waste water cesspool and the thickened sludge that has been separated from the water being collected in a sludge chamber of at least one dewatering vessel, comprising the steps of:

clearing the dewatering vessel of both residual treated water and of sludge collected in the vessel by first discharging the treated water back into the waste water cesspool, and then discharging the residual treated water into a filtrate chamber of a second dewatering vessel and discharging the sludge to a sludge chamber of the second dewatering vessel.

2. Method according to claim 1, wherein the sludge tank also is cleared of the sludge after discharge of the main portion of the treated water from the dewatering unit back to the waste water cesspool.

3. Method according to claim 1, comprising the further step of clearing the entire dewatering plant of residual treated water and sludge particles after discharge of the treated water from at least one dewatering vessel back to a waste water cesspool.

4. Method according to claim 1, the treated water is exposed to radiation which at least partially destroys any germs or bacteria contained therein before or during discharge back into said waste water cesspool.

5. Method according to claim 4, characterized in that the treated water is exposed to ultraviolet radiation whose maximum amplitude is about 253.7 nanometers.

6. Apparatus for the treatment or dewatering of sludge water taken from waste water cesspools by means of a dewatering plant arranged on a vehicle, said dewatering plant comprising:

a sludge tank (30) operative for initial collection of the sludge water and provided with a flocculation unit;

at least one sludge water pipe (1S) leading from the waste water cesspool (1a) to the sludge tank (30);

said sludge water pipe (1S) being fitted with a first sludge valve (13);

at least two dewatering units connected with said sludge tank (30) downstream in the flow of the sludge water;

a first said dewatering unit comprising a first dewatering vessel (25) with filter sieve walls (10), at least one first sludge chamber (26a) for dewatered sludge, and a first filtrate chamber (25);

said first dewatering vessel (26) being connected to the sludge tank (30) by means of a pumping-up pipe (2), which serves as a first sludge discharge pipe;

said pumping-up pipe (2) being fitted with a first sludge pump (5), a second sludge valve (19), and a sludge cleaning valve (9);

said first filtrate chamber (25) being connected by means of a water return pipe (7b) to a hose that can be inserted into the water cesspool (1a);

said water return pipe (7b) being fitted with a first filtrate pump (8) and a filtrate valve (12);

a second said dewatering unit comprises a second dewatering vessel (23), at least one second sludge chamber (23a) for dewatered sludge and a second filtrate chamber (22);

said first filtrate chamber (25) of said first dewatering unit being connected to at least said downstream second filtrate chamber (22) of said second dewatering vessel (23) of said second dewatering unit by way of a filtrate pipe (16a);

said filtrate pipe (16a) being fitted with a second filtrate pump (15) and a controllable filtrate valve (16), said first sludge chamber (26a) of said first dewatering unit being connected to at least said downstream second sludge chamber (23a) of said second dewatering vessel (23) of said second dewatering unit by way of a second sludge discharge pipe; and said second sludge discharge pipe being fitted with a second sludge pump (7) and a third sludge valve (14).

7. Apparatus according to claim 6, wherein an additional outlet (9) of the sludge tank (30) is connected to an inlet (24a) of the second sludge chamber (23a) of the second dewatering vessel (23) by way of a third sludge return pipe (17a) containing a controllable valve (17) and by way of a feed pipe (24b).

8. Apparatus according to claim 6, wherein at least one stone trap (4) is incorporated in the sludge-water pipe (1S) leading from the waste water cesspool (1a) to the sludge tank (30).

9. Apparatus according to claim 8, wherein one part of the stone trap is incorporated in the sludge return pipe (17a) leading from the sludge tank (30) to the second sludge chamber (23a).

10. Apparatus according to claim 6, wherein at least one return pipe (7b) conveying treated water from said first dewatering unit back to the waste water cesspool (1a) is connected with a chamber (21) equipped with at least one germ-destroying ultraviolet radiator (21).

11. Apparatus according to claim 10, wherein at least one return pipe section (1S, 7b), or at least one wall of the chamber housing the radiator (21) is made of a material which is permeable to the light emitted by the radiator.

* * * * *